(12) United States Patent
Naito

(10) Patent No.: US 12,241,221 B2
(45) Date of Patent: Mar. 4, 2025

(54) WHEEL LOADER AND METHOD FOR CONTROLLING WHEEL LOADER

(71) Applicant: KOMATSU LTD., Tokyo (JP)

(72) Inventor: Toru Naito, Tokyo (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 18/141,646

(22) Filed: May 1, 2023

(65) Prior Publication Data

US 2023/0257960 A1    Aug. 17, 2023

Related U.S. Application Data

(63) Continuation of application No. 17/023,673, filed on Sep. 17, 2020, now Pat. No. 11,674,285, which is a
(Continued)

(30) Foreign Application Priority Data

Aug. 31, 2016   (JP) .................................. 2016-169498

(51) Int. Cl.
*E02F 3/43* (2006.01)
*B60Q 5/00* (2006.01)
(Continued)

(52) U.S. Cl.
CPC .............. *E02F 3/431* (2013.01); *B60Q 5/005* (2013.01); *B60Q 9/008* (2013.01); *E02F 3/34* (2013.01);
(Continued)

(58) Field of Classification Search
CPC ... E02F 3/34; E02F 3/422; E02F 3/431; E02F 3/434; E02F 9/0858; E02F 9/2004;
(Continued)

(56) References Cited

U.S. PATENT DOCUMENTS 4,800,660 A * 1/1989 Masao .................. E02F 9/2253
                                                    37/442
5,116,187 A * 5/1992 Fukuda .................. F16H 61/16
                                                    37/442
(Continued)

FOREIGN PATENT DOCUMENTS

CN           1571872 A      1/2005
CN         101246038 A      8/2008
(Continued)

OTHER PUBLICATIONS

Zhang Fengxiang et al., "Sinking Well & Caisson," China Railway Publishing House, published on Jan. 31, 2022, pp. 135-137 (corresponding to English-language translation of Chinese Office Action issued Jul. 26, 2023 in Application No. 201780016870).

(Continued)

*Primary Examiner* — Tyler J Lee
(74) *Attorney, Agent, or Firm* — Faegre Drinker Biddle & Reath LLP

(57) ABSTRACT

A wheel loader includes: a front frame; a bucket; a boom having a distal end connected to bucket, and a proximal end rotatably supported by front frame; a sensor configured to measure a distance between boom and a loading target; and a controller configured to control an action of wheel loader. The controller causes wheel loader to perform a predetermined action for collision avoidance on condition that a distance to be measured by sensor when wheel loader travels takes a value less than or equal to a threshold value.

9 Claims, 15 Drawing Sheets

Related U.S. Application Data continuation of application No. 16/082,284, filed as application No. PCT/JP2017/029271 on Aug. 14, 2017, now Pat. No. 10,815,640.

(51) Int. Cl.
*B60Q 9/00* (2006.01)
*E02F 3/34* (2006.01)
*E02F 3/42* (2006.01)
*E02F 9/08* (2006.01)
*E02F 9/20* (2006.01)
*E02F 9/24* (2006.01)
*E02F 9/26* (2006.01)

(52) U.S. Cl.
CPC .............. *E02F 3/422* (2013.01); *E02F 3/434* (2013.01); *E02F 9/0858* (2013.01); *E02F 9/2004* (2013.01); *E02F 9/2033* (2013.01); *E02F 9/24* (2013.01); *E02F 9/262* (2013.01); *E02F 9/265* (2013.01)

(58) Field of Classification Search
CPC . E02F 9/2033; E02F 9/24; E02F 9/262; E02F 9/265; B60Q 5/005; B60Q 9/008
See application file for complete search history.

(56) References Cited

U.S. PATENT DOCUMENTS

| | | | |
|---|---|---|---|
| 5,528,498 A | 6/1996 | Scholl | |
| 6,108,949 A | 8/2000 | Singh et al. | |
| 6,247,538 B1* | 6/2001 | Takeda | G05D 1/0234 37/348 |
| 6,363,632 B1* | 4/2002 | Stentz | E02F 9/24 701/50 |
| 6,470,606 B1 | 10/2002 | Nagahiro et al. | |
| 6,711,838 B2* | 3/2004 | Staub | E02F 9/26 701/50 |
| 6,931,772 B2* | 8/2005 | Furuno | E02F 9/264 701/50 |
| 7,603,235 B2 | 10/2009 | Makela et al. | |
| 8,386,134 B2* | 2/2013 | Morey | G01G 23/37 177/136 |
| 8,768,583 B2 | 7/2014 | Hargrave, Jr. et al. | |
| 9,133,600 B2 | 9/2015 | Martinsson et al. | |
| 9,206,587 B2 | 12/2015 | Linstroth et al. | |
| 9,441,348 B1* | 9/2016 | Alig | E02F 3/431 |
| 9,545,048 B2* | 1/2017 | Pickett | A01B 69/008 |
| 9,587,369 B2* | 3/2017 | Fletcher | E02F 3/283 |
| 9,783,952 B2* | 10/2017 | Nagato | G07C 5/0816 |
| 9,809,948 B2* | 11/2017 | Imaizumi | E02F 9/2029 |
| 9,832,386 B2 | 11/2017 | Hasejima et al. | |
| 10,094,093 B2 | 10/2018 | Halepatali et al. | |
| 10,538,897 B2 | 1/2020 | Uetake et al. | |
| 10,570,589 B2 | 2/2020 | Eidenberger et al. | |
| 11,293,164 B2* | 4/2022 | Enomoto | E02F 9/26 |
| 2005/0000703 A1* | 1/2005 | Furuno | G01G 19/08 172/2 |
| 2006/0097570 A1 | 5/2006 | Doerr et al. | |
| 2011/0040459 A1* | 2/2011 | Takiguchi | E02F 9/2296 701/50 |
| 2012/0296531 A1* | 11/2012 | Hyodo | E02F 9/264 701/50 |
| 2013/0302761 A1 | 11/2013 | Best et al. | |
| 2014/0088824 A1 | 3/2014 | Ishimoto | |
| 2015/0176253 A1* | 6/2015 | Taylor | E02F 9/265 701/33.9 |
| 2016/0040398 A1* | 2/2016 | Kitajima | E02F 3/435 701/50 |
| 2016/0185346 A1 | 6/2016 | Awamori et al. | |
| 2016/0232816 A1* | 8/2016 | Cai | G07C 5/0808 |
| 2016/0251829 A1* | 9/2016 | Imaizumi | E02F 9/2296 701/50 |
| 2016/0264133 A1 | 9/2016 | Ohsugi et al. | |
| 2016/0264134 A1 | 9/2016 | Ohsugi et al. | |
| 2016/0265185 A1* | 9/2016 | Imaizumi | E02F 9/2029 |
| 2016/0289926 A1* | 10/2016 | Alig | E02F 9/2004 |
| 2017/0002541 A1 | 1/2017 | Fletcher et al. | |
| 2017/0002542 A1 | 1/2017 | Fletcher et al. | |
| 2017/0002546 A1 | 1/2017 | Fletcher et al. | |
| 2019/0226181 A1 | 7/2019 | Imura et al. | |
| 2020/0199852 A1* | 6/2020 | Hyodo | E02F 9/2253 |
| 2021/0122620 A1 | 4/2021 | Schulz et al. | |

FOREIGN PATENT DOCUMENTS

| | | |
|---|---|---|
| CN | 204475392 U | 7/2015 |
| CN | 104890661 A | 9/2015 |
| CN | 205296249 U | 6/2016 |
| JP | H06-193098 A | 7/1994 |
| JP | H07-34483 A | 2/1995 |
| JP | H10-1968 A | 1/1998 |
| JP | H10-77659 A | 3/1998 |
| JP | H10-88625 A | 4/1998 |
| JP | 2003-184131 A | 7/2003 |
| JP | 2006-195877 A | 7/2006 |
| JP | 2007-23486 A | 2/2007 |
| JP | 2008-133657 A | 6/2008 |
| JP | 2008-144378 A | 6/2008 |
| JP | 2008-303574 A | 12/2008 |
| JP | 2010-053588 A | 3/2010 |
| JP | 2015-214409 A | 12/2015 |
| KR | 2013-0055302 A | 5/2013 |
| KR | 2015-0041935 A | 4/2015 |

OTHER PUBLICATIONS

English-language translation of Chinese Office Action issued Jul. 26, 2023 in Application No. 201780016870.

* cited by examiner

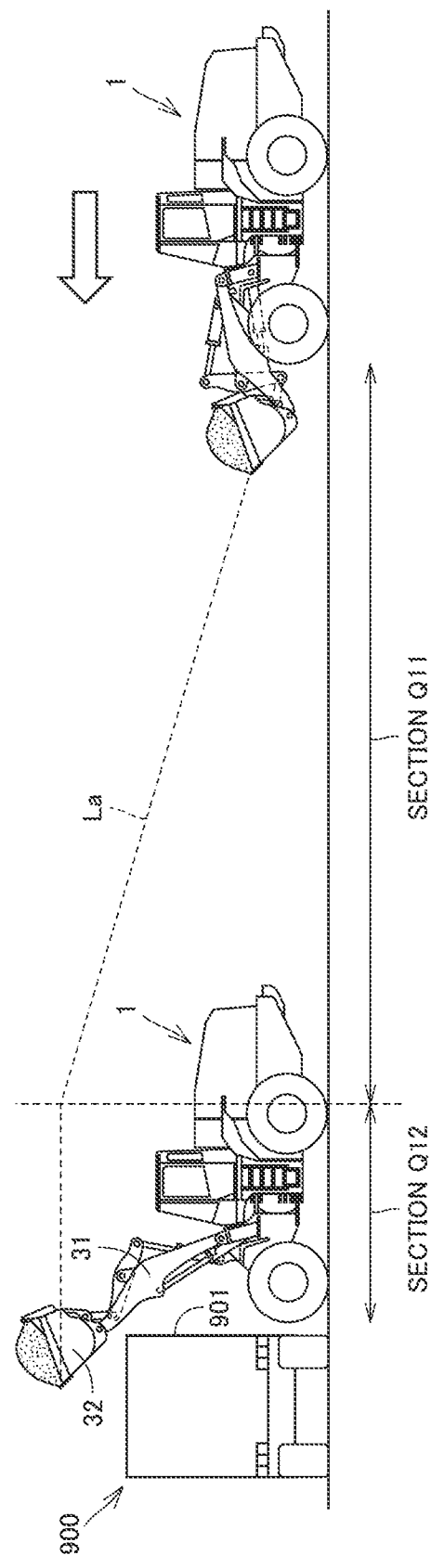

WHEEL LOADER AND METHOD FOR CONTROLLING WHEEL LOADER

CROSS-REFERENCE TO RELATED APPLICATIONS

This application is a continuation of U.S. patent application Ser. No. 17/023,673, filed Sep. 17, 2020, which is a continuation of U.S. patent application Ser. No. 16/082,284, filed Sep. 5, 2018, now U.S. Pat. No. 10,815,640, issued Oct. 27, 2020, which is 371 of International Patent Application No. PCT/JP2017/029271, filed Aug. 14, 2017, which claims the benefit of priority to Japanese Patent Application No. 2016-169498, filed Aug. 31, 2016, the contents of each of which is incorporated herein by reference.

TECHNICAL FIELD

The present invention relates to a wheel loader and a method for controlling the wheel loader.

BACKGROUND ART

A wheel loader that is an example of self-propelled work vehicles includes a traveling apparatus that causes the vehicle to travel, and a work implement that performs various operations/services including excavation. The traveling apparatus and the work implement are each driven by driving force from an engine.

Japanese Patent Laying-Open No. 2008-303574 (PTL 1) discloses a wheel loader including a video camera or a laser distance sensor disposed on a front wheel axle case. The video camera is configured to capture an image of a road surface forward of a position of a bucket, through a clearance below the bucket. The wheel loader also includes a display apparatus configured to display an image captured by the video camera or a distance measured by the laser distance sensor on a place where an operator on an operator's seat sees the image or the distance. The operator thus monitors a status of a road surface below a work implement.

Japanese Patent Laying-Open No. 10-88625 (PTL 2) discloses an automatic excavator (e.g., a wheel loader) including a visual sensor constituted of two cameras. In the automatic excavator, the visual sensor measures a distance from the automatic excavator to a target to be excavated or a dump truck, for the sake of automatic excavation.

An operator of a wheel loader simultaneously actuates an accelerator pedal and a boom lever to load, on a bed of a dump truck, soil scooped by a bucket of a work implement. The wheel loader thus simultaneously performs fore traveling and boom-raising. Such a loading operation/service is also called "dump approach".

CITATIONS LIST

Patent Literature

PTL 1: Japanese Patent Laying-Open No. 2008-303574
PTL 2: Japanese Patent Laying-Open No. 10-88625

SUMMARY OF INVENTION

Technical Problem

In a loading operation/service, an operator needs to operate a wheel loader so as to prevent a leading end of a front wheel from colliding with a lateral side of a dump truck and so as to prevent a work implement (particularly, a lower end of a boom) from colliding with the lateral side of the dump truck (specifically, an upper portion of a vessel). As described above, the operator needs to implement the loading operation/service while checking on the upper and lower locations at the same time.

The present disclosure has been made in view of the problem described above. The present disclosure provides a wheel loader that assists an operation by an operator in loading an excavated object such as excavated soil onto a loading target (e.g., a dump truck). The present disclosure also provides a method for controlling the wheel loader.

Solution to Problem

According to an aspect of the present disclosure, a wheel loader for loading an excavated object onto a loading target includes: a front frame; a bucket; a boom having a distal end connected to the bucket, and a proximal end rotatably supported by the front frame; a sensor configured to measure a distance between the boom and the loading target; and a controller configured to control an action of the wheel loader. The controller causes the wheel loader to perform a predetermined action for collision avoidance on condition that a distance to be measured by the sensor when the wheel loader travels takes a value less than or equal to a threshold value.

Advantageous Effects of Invention

A wheel loader according to an aspect of the present disclosure assists an operation by an operator in loading an excavated object onto a loading target.

BRIEF DESCRIPTION OF DRAWINGS

FIG. 6 illustrates a typical operation by an operator in dump approach.

DESCRIPTION OF EMBODIMENTS

Embodiments will be described below with reference to the drawings. It is originally planned to utilize configurations of the embodiments in appropriate combination. In addition, some of constituent elements are not employed occasionally.

A description will be given of a wheel loader with reference to the drawings. In the following description, the terms "upper", "lower", "front", "rear", "left", and "right" are defined with respect to an operator who sits in an operator's seat.

A dump truck will be described as an example of a loading target onto which an excavated object is loaded; however, the loading target is not limited thereto, but may be a non-self-propelled loading target such as a soil container.

First Embodiment

<Overall Configuration>

Figure 1:
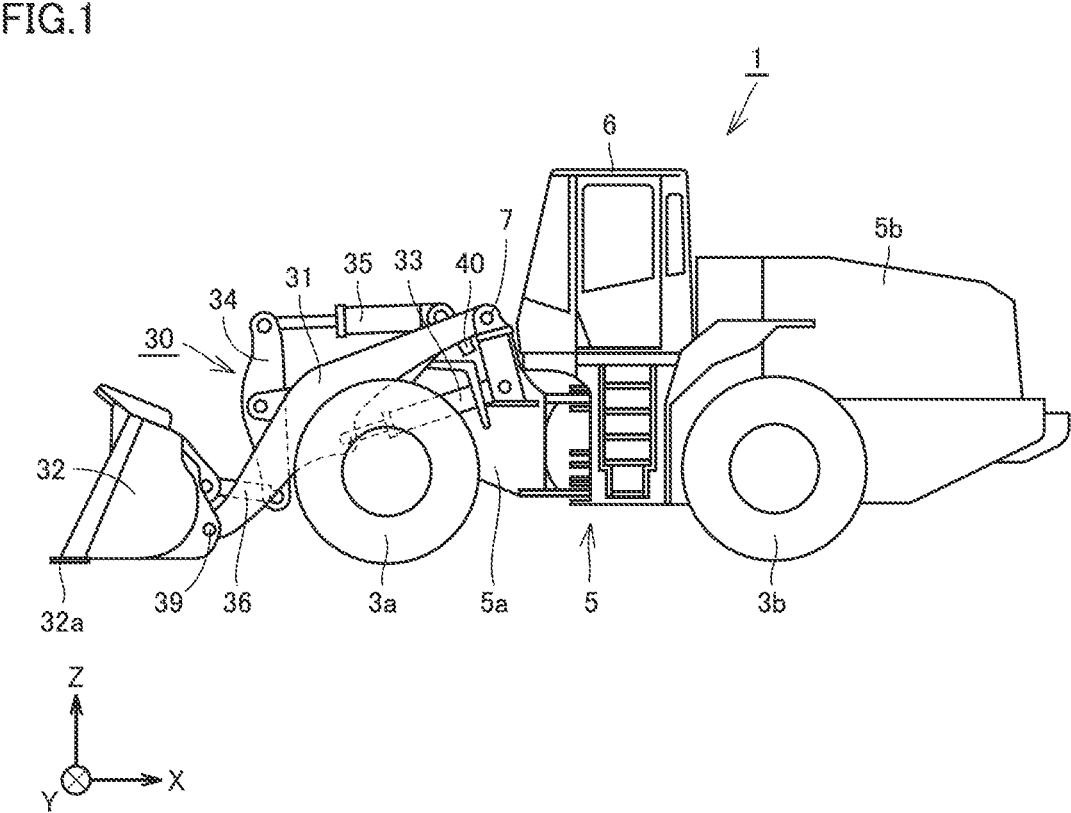
FIG. 1 is a side view of a wheel loader.

FIG. 1 is a side view of a wheel loader 1 according to a first embodiment. FIG. is a top view of wheel loader 1.

Figure 2:
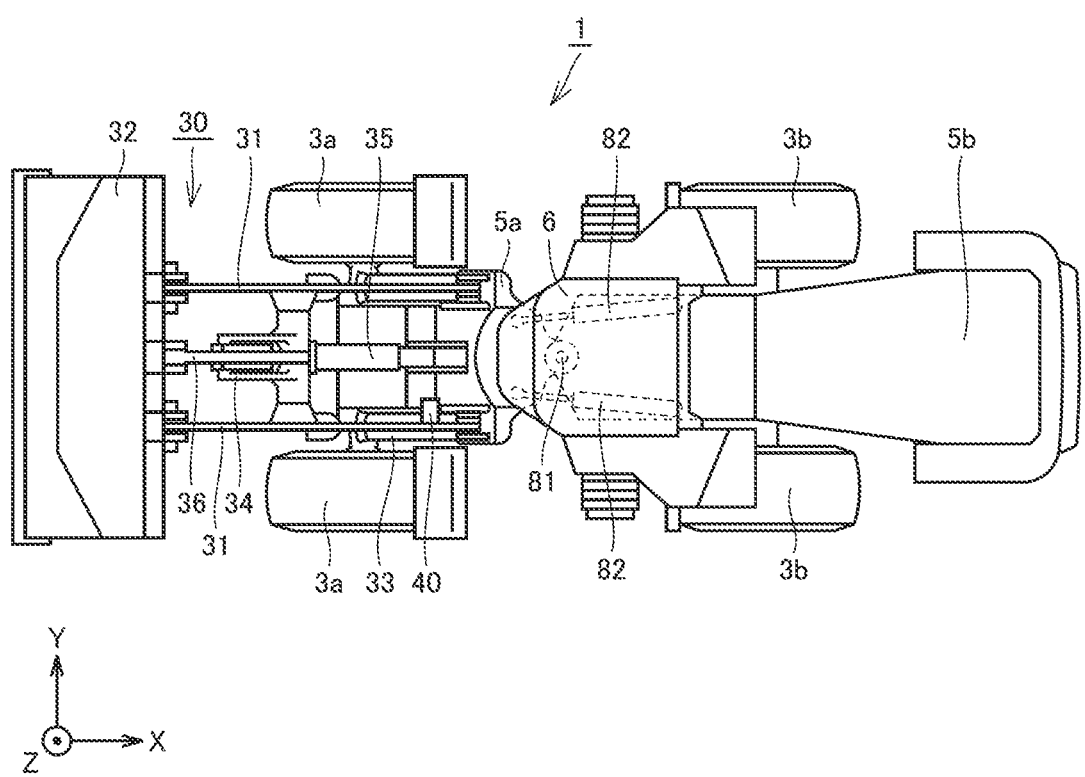
FIG. 2 is a top view of the wheel loader.

As illustrated in FIGS. 1 and 2, wheel loader 1 includes a main body 5, a work implement 30, wheels 3a and 3b, and an operator's cab 6. Wheel loader 1 is self-propelled in such a manner that wheels 3a and 3b are rotated. In addition, wheel loader 1 performs desired operations/services using work implement 30.

Main body 5 includes a front frame 5a and a rear frame 5b. Front frame 5a and rear frame 5b are connected to each other by a center pin 81 so as to be swingable laterally.

Steering cylinders 82 are provided in a pair so as to extend from front frame 5a to rear frame 5b. Each steering cylinder 82 is a hydraulic cylinder to be driven by hydraulic oil from a steering pump (not illustrated). Front frame 5a swings relative to rear frame 5b by expansion and contraction of steering cylinders 82. This action changes a traveling direction of wheel loader 1.

Work implement 30 and a pair of front wheels 3a are mounted to front frame 5a. Work implement 30 is disposed forward of main body 5. Work implement 30 is driven by hydraulic oil from a hydraulic pump 119 (see FIG. 3). Work implement 30 includes a boom 31, a pair of lift cylinders 33, a bucket 32, a bell crank 34, a tilt cylinder 35, and a tilt rod 36 connecting a distal end of bell crank 34 to bucket 32.

Boom 31 is rotatably supported by front frame 5a. Boom 31 has a proximal end (proximal end) mounted to front frame 5a by a boom pin 7 such that boom 31 is swingable. Each lift cylinder 33 has a first end mounted to front frame 5a. Each lift cylinder 33 has a second end mounted to boom 31. Preferably, the second end of each lift cylinder 33 is mounted to a lower end of boom 31. Front frame 5a and boom 31 are connected to each other by lift cylinders 33. Boom 31 swings upward and downward about boom pin 7 by expansion and contraction of lift cylinders 33 using the hydraulic oil from hydraulic pump 119.

FIG. 1 illustrates only one of lift cylinders 33.

Bucket 32 is rotatably supported by a leading end of boom 31. Bucket 32 is swingably directed to a distal end of boom 31 by a bucket pin 39. Tilt cylinder 35 has a first end mounted to front frame 5a. Tilt cylinder 35 has a second end mounted to bell crank 34. Bell crank 34 and bucket 32 are connected to each other by a link apparatus (not illustrated). Front frame 5a and bucket 32 are connected to each other by tilt cylinder 35, bell crank 34, and the link apparatus. Bucket 32 swings upward and downward about bucket pin 39 by expansion and contraction of tilt cylinder 35 using the hydraulic oil from hydraulic pump 119.

Operator's cab 6 and a pair of rear wheels 3b are mounted to rear frame 5b. Operator's cab 6 is mounted on main body 5. Operator's cab 6 includes, for example, a seat in which an operator sits, and devices for operations (to be described later).

Wheel loader 1 further includes a sensor 40 configured to measure a distance between boom 31 and a dump truck as a loading target. Sensor 40 is disposed on boom 31. Sensor 40 therefore moves together with boom 31.

Specifically, sensor 40 is disposed at a predetermined position in boom 31. The predetermined position is closer to the proximal end of boom 31 than to the distal end of boom 31. Sensor 40 is disposed on the lower end of boom 31. Sensor 40 is disposed near boom pin 7. As used herein, the phrase "lower end of boom 31" refers to the lower (ground side) half of boom 31, including a lower face of boom 31.

As will be described later, sensor 40 measures a distance (hereinafter, also referred to as "distance D") between boom 31 and a vessel of the dump truck. Sensor senses the lower end of boom 31. Sensor 40 may be any device for measuring a distance. Examples of sensor 40 may include various devices such as an ultrasonic sensor, a laser sensor, an infrared sensor, and a camera.

Figure 3:
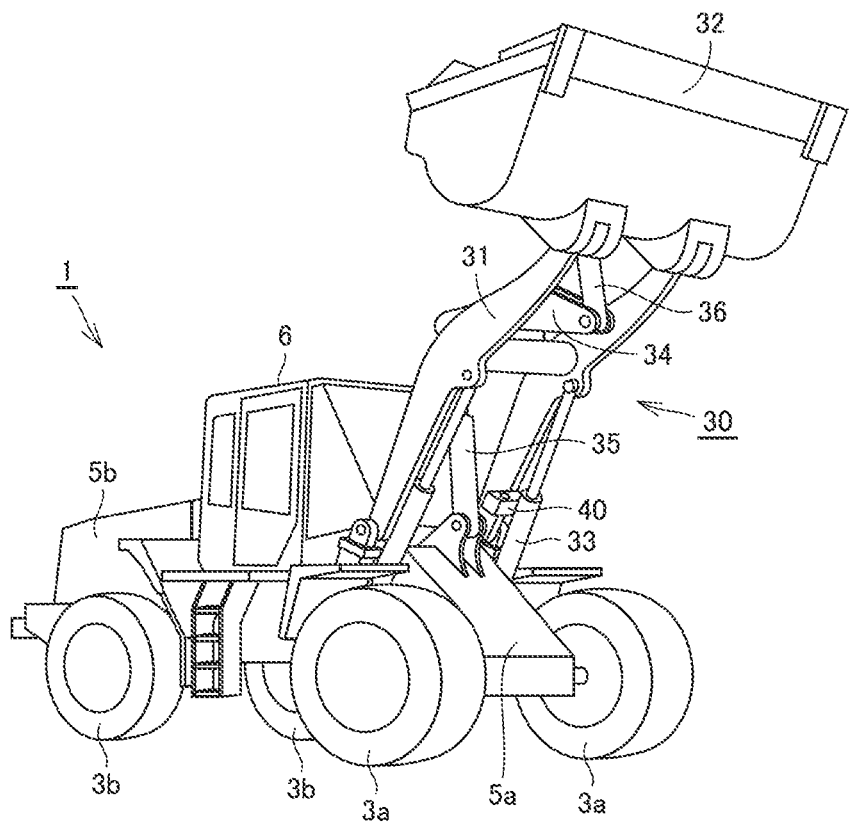
FIG. 3 is a perspective view of the wheel loader.

FIG. 3 is a perspective view of wheel loader 1. As illustrated in FIG. 3, boom is raised based on an operation by the operator, so that bucket 32 is also raised. The operator decreases a tilt angle (angle θ in FIG. 14) of bucket 32 with an excavated object such as excavated soil loaded on the bucket. The excavated object is thus loaded onto the loading target such as the dump truck.

Figure 4A:
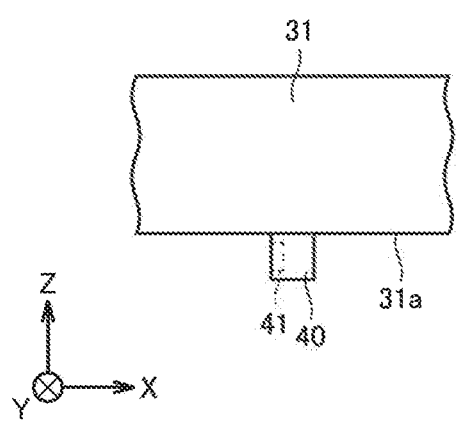
FIGS. 4A and 4B each illustrate a positional relationship between a left boom and a sensor.
Figure 4B:
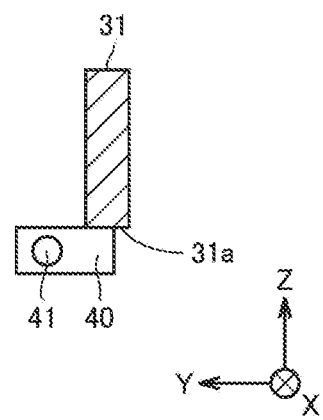

FIGS. 4A and 4B each illustrate a positional relationship between left boom 31 and sensor 40. As illustrated in FIGS. 4A and 4B, sensor 40 is disposed on lower end 31a of boom 31. Sensor 40 includes a housing, and a lens 41 disposed in the housing at a position near the distal end of boom 31.

In wheel loader 1, lens 41 is disposed on the right side of left boom 31 (i.e., is disposed on left boom 31 at a position near right boom 31); however, the present disclosure is not limited to this configuration. For example, lens 41 may be disposed on the left side of left boom 31. Alternatively, the sensor may be disposed on right boom 31.

Figure 5:
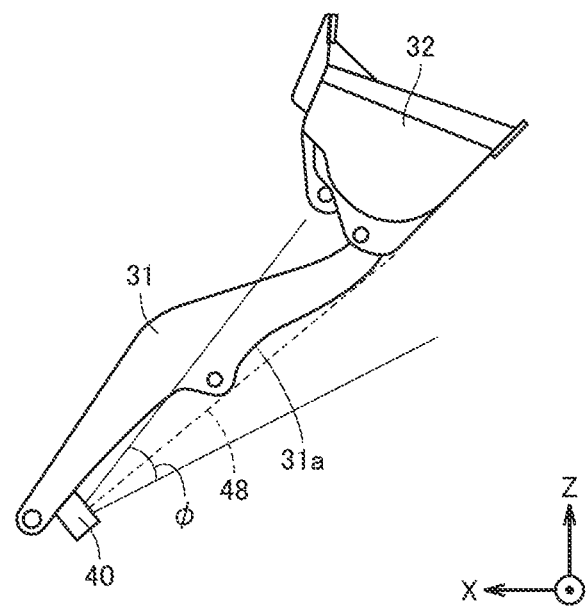
FIG. 5 schematically illustrates a sensing area of the sensor.

FIG. 5 schematically illustrates a sensing area of sensor 40. As illustrated in FIG. 5, sensor 40 is disposed such that an optical axis 48 of sensor 40 extends along boom 31.

Sensor 40 senses an area covering lower end 31a of boom 31. Sensor 40 may sense an area closer to the distal end of boom 31 than to the proximal end of boom 31, in lower end 31a of boom 31. Preferably, sensor 40 senses an area ranging from the position of the second end of each lift cylinder 33 mounted to boom 31 to the distal end of boom 31, in lower end 31a of boom 31. Alternatively, sensor 40 may sense a part of each area described above.

Sensor 40 disposed as described above measures a distance between boom 31 and the dump truck as the loading target. Information acquired by sensor 40 is sent to a controller 110 (FIG. 8) of wheel loader 1 and then is subjected to data processing in controller 110 as will be described later.

<Dump Approach>

FIG. 6 illustrates a typical operation by the operator in dump approach. As illustrated in FIG. 6, the operator initiates acceleration in a section Q11. Specifically, the operator presses an accelerator pedal (not illustrated). Also in section Q11, the operator actuates a boom control lever 122 (FIG. 8) to raise boom 31 as will be described later. In section Q11, wheel loader 1 thus travels toward dump truck 900 while performing boom-raising.

The operator initiates acceleration in section Q11 for the purpose of supplying a satisfactory amount of oil to lift cylinders 33, rather than for the purpose of causing wheel loader 1 to travel. Increasing an engine speed ensures an output of hydraulic oil from the hydraulic pump. Accordingly, the operator still presses the accelerator pedal even when he or she presses a brake pedal to decrease a vehicle speed in section Q11.

In a section Q12 subsequent to section Q11, the operator ceases the acceleration and then initiates braking. Specifically, the operator presses the brake pedal (not illustrated) instead of the accelerator pedal. The operator thus brings wheel loader 1 to a stop in front of dump truck 900. Thereafter, the operator actuates a bucket control lever 123 (FIG. 8) to load soil scooped by bucket 32 onto a bed of dump truck 900 as will be described later.

A broken line La represents a path along which bucket 32 typically moves in the series of operations.

Figure 7A:
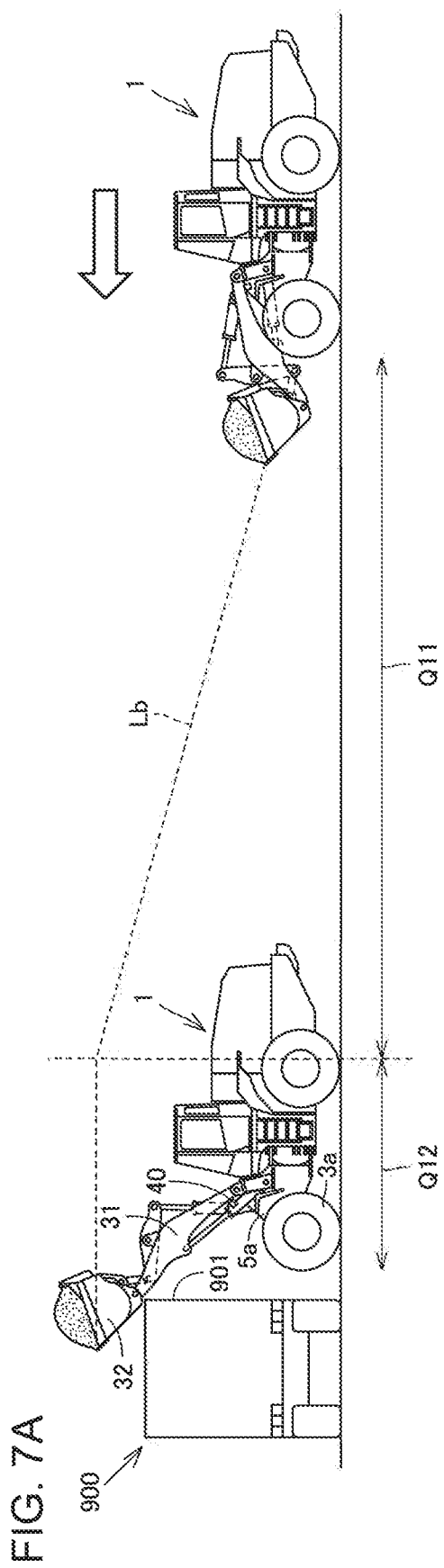
FIGS. 7A and 7B each illustrate a situation in which the operator does not raise the boom to a position where an excavated object is loadable onto a vessel of a dump truck, in the dump approach.
Figure 7B:
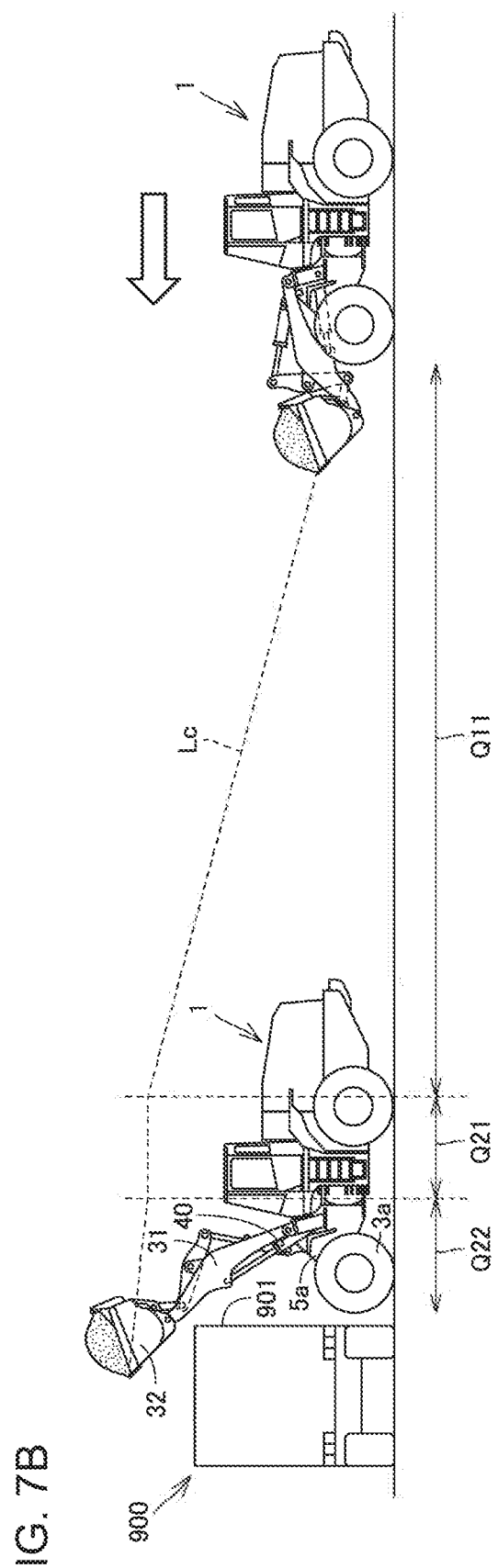

FIGS. 7A and 7B each illustrate a situation in which the operator does not raise boom 31 to a position where an excavated object is loadable onto vessel 901 of dump truck 900, in the dump approach. FIG. 7A illustrates the dump approach on the assumption that an output from sensor 40 is not utilized. FIG. 7B illustrates the dump approach on the assumption that an output from sensor 40 is utilized. FIG. 7A illustrates a comparative example for clarifying a feature of the damp approach in FIG. 7B.

As illustrated in FIG. 7A, if the operator does not raise boom 31 to a height illustrated in FIG. 6 in section Q11, the following event can occur in section Q12. In order to avoid a leading end of each front wheel 3a in wheel loader 1 from colliding with a lateral side of dump truck 900, the operator causes wheel loader 1 to travel forward while seeing front wheels 3a. As a result, the lower end of boom 31 collides with an upper portion of vessel 901 of dump truck 900 before each front wheel 3a arrives at a position where the operator intends to stop wheel loader 1. According to this embodiment, the use of sensor 40 enables avoidance of this event. With reference to FIG. 7B, a description will be given of how to avoid this event. In FIG. 7A, a broken line Lb represents a path of bucket 32.

If the operator does not raise boom 31 to the height illustrated in FIG. 6 in section Q11, wheel loader 1 (specifically, controller 110) controls boom-raising as illustrated in FIG. 7B.

Wheel loader 1 determines whether distance D to be measured by sensor 40 (i.e., the distance between boom 31 and dump truck 900) takes a value less than or equal to a threshold value. When wheel loader 1 determines that the value of distance D measured is less than or equal to the threshold value, then wheel loader 1 starts to raise boom 31. For example, wheel loader 1 does not raise boom 31 in a section Q21 during which the value of distance D measured is larger than the threshold value. When wheel loader 1 arrives at a section Q22 during which the value of distance D measured is less than or equal to the threshold value, then wheel loader 1 starts to raise boom 31.

As described above, wheel loader 1 includes sensor 40 configured to measure distance D between boom 31 and dump truck 900. Controller 110 of wheel loader 1 causes wheel loader 1 to perform boom-raising on condition that distance D to be measured by sensor 40 when wheel loader 1 travels takes a value less than or equal to the threshold value.

As described above, wheel loader 1 moves boom 31 away from vessel 901 before collision of boom 31 with vessel 901 in the dump approach. Wheel loader 1 accordingly avoids the collision of boom 31 with dump truck 900 even when the operator neglects to confirm the position of boom 31 because he or she pays excessive attention to the position of each front wheel 3a. Wheel loader 1 therefore assists the operation by the operator in the dump approach.

<Functional Configuration>

Figure 8:
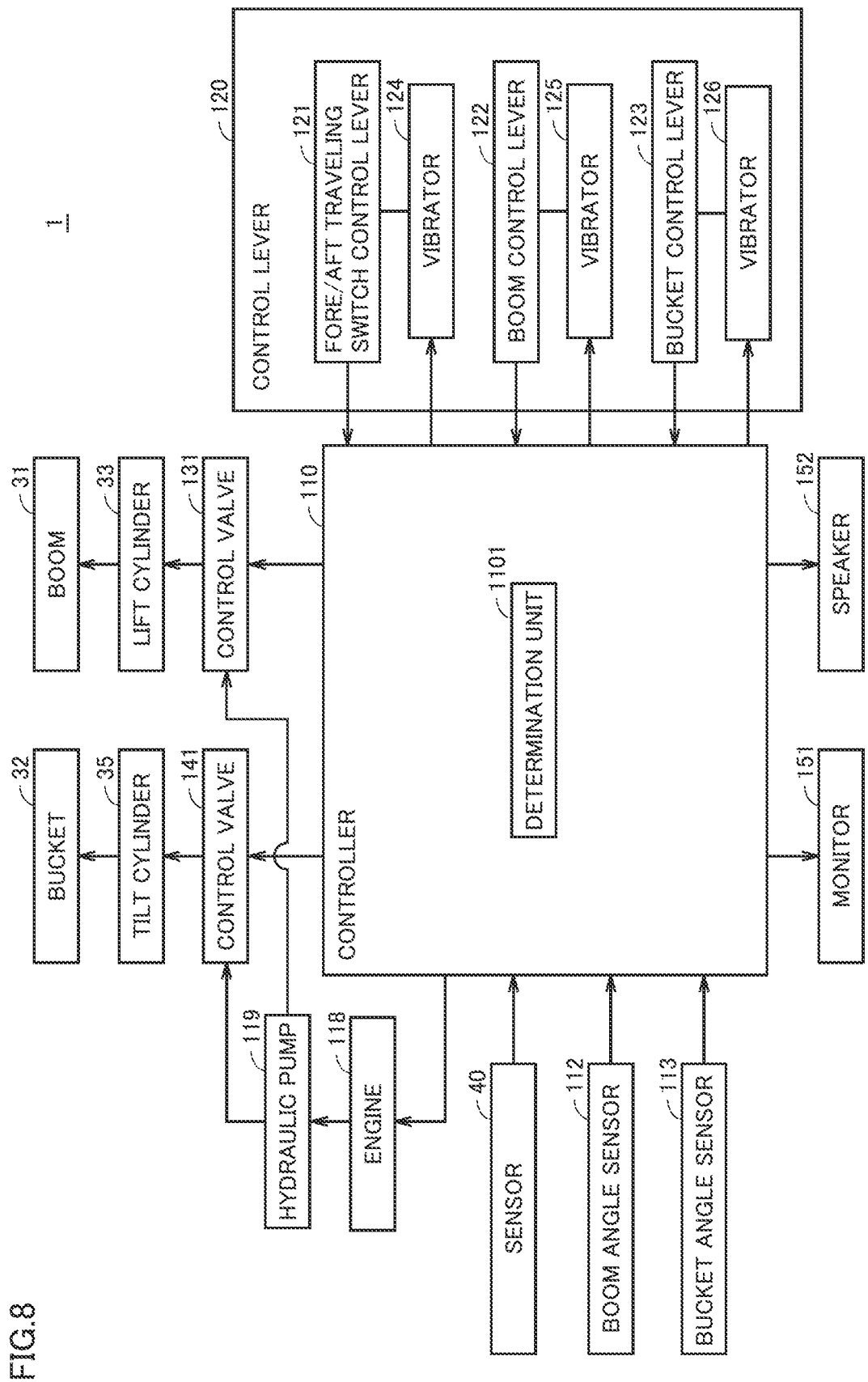
FIG. 8 is a block diagram of a system configuration of the wheel loader.

FIG. 8 is a block diagram of a system configuration of wheel loader 1. As illustrated in FIG. 8, wheel loader 1 includes boom 31, bucket 32, lift cylinders 33, tilt cylinder 35, sensor 40, controller 110, a boom angle sensor 112, a bucket angle sensor 113, an engine 118, hydraulic pump 119, a control lever 120, control valves 131 and 141, a monitor 151, and a speaker 152.

Control lever 120 includes a fore/aft traveling switch control lever 121, boom control lever 122, bucket control lever 123, and vibrators 124, 125, and 126. Controller 110 includes a determination unit 1101.

Controller 110 controls the overall actions of wheel loader 1. Controller 110 controls, for example, a rotation speed of engine 118, based on the actuation of the accelerator pedal. In addition, the controller receives a signal based on the actuation of control lever 120 by the operator, and then causes wheel loader 1 to perform an action in accordance with the actuation.

Hydraulic pump 119 is driven by an output from engine 118. Hydraulic pump supplies the hydraulic oil to lift cylinders 33 via control valve 131 such that boom is driven. Boom 31 is raised or lowered by actuation of boom control lever 122 in operator's cab 6. Hydraulic pump 119 also supplies the hydraulic oil to tilt cylinder via control valve 141 such that bucket 32 is driven. Bucket 32 is acted by actuation of bucket control lever 123 in operator's cab 6.

Controller 110 successively receives results of sensing from sensor 40. In the dump approach, determination unit 1101 of controller 110 determines whether distance D to be measured by sensor 40 takes a value less than or equal to threshold value Th. When determination unit 1101 determines that the value of distance D is less than or equal to threshold value Th, controller 110 starts to raise boom 31.

Controller 110 receives a signal according to a boom angle from boom angle sensor 112. Controller 110 also receives a signal according to a tilt angle from bucket angle sensor 113. A description will be given of how to utilize signals (results of sensing) output from boom angle sensor 112 and bucket angle sensor 113, later.

Controller 110 causes monitor 151 to display various images. Controller 110 causes speaker 152 to output a predetermined sound. A description will be given of how to utilize monitor 151 and speaker 152, later.

Vibrator 124 is configured to vibrate fore/aft traveling switch control lever 121. Vibrator 125 is configured to vibrate boom control lever 122. Vibrator 126 is configured to vibrate bucket control lever 123. A description will be given of how to utilize vibrators 124 to 126, later.

<Control Structure>

Figure 9:
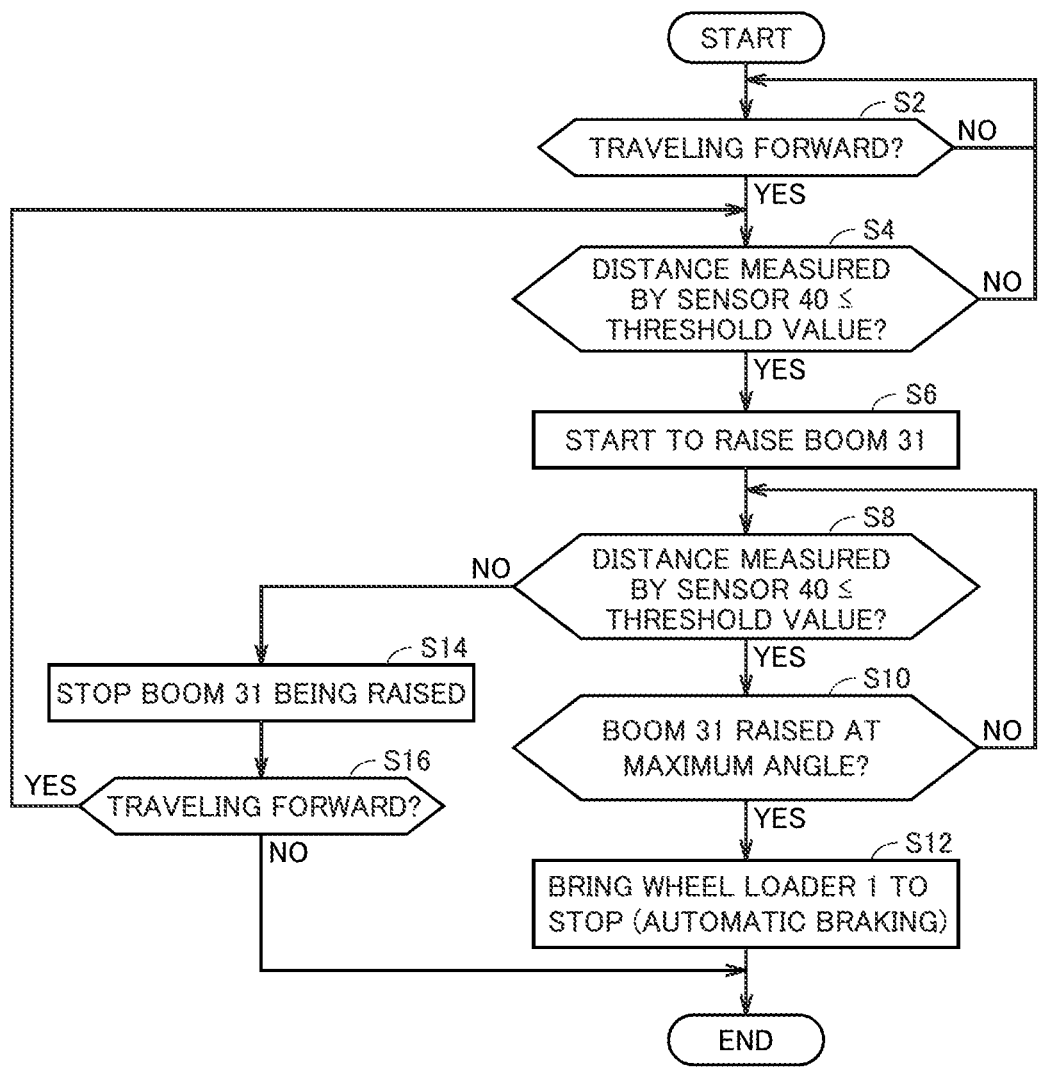
FIG. 9 is a flowchart of a processing flow in the wheel loader.

FIG. 9 is a flowchart of a processing flow in wheel loader 1. As illustrated in FIG. 9, in step S2, controller 110 determines whether wheel loader 1 is traveling forward. When controller 110 determines that wheel loader 1 is traveling forward (YES in step S2), then, in step S4, controller 110 determines whether distance D measured by sensor 40 takes a value less than or equal to threshold value Th. When controller 110 determines that wheel loader 1 is not traveling forward (NO in step S2), the processing goes back to step S2.

When controller 110 determines that the value of distance D is less than or equal to threshold value Th (YES in step S4), then, in step S6, controller 110 starts to raise boom 31. When controller 110 determines that the value of distance D is larger than threshold value Th (NO in step S4), the processing goes back to step S2. In step S8, controller 110 determines whether distance D measured by sensor 40 takes a value less than or equal to threshold value Th.

When controller 110 determines that the value of distance D is larger than threshold value Th (YES in step S8), then, in step S14, controller 110 stops boom 31 being raised. In step S16 subsequent to step S14, controller 110 determines whether wheel loader 1 is traveling forward. When controller 110 determines that wheel loader 1 is traveling forward (YES in step S16), the processing goes back to step S4. When controller 110 determines that wheel loader 1 is not traveling forward (NO in step S16), the processing ends.

When controller 110 determines that the value of distance D is less than or equal to threshold value Th (NO in step S8), then, in step S10, controller 110 determines whether an angle (a boom angle) of boom 31 is maximum. Specifically, controller 110 determines whether each of lift cylinders 33 has extended to its stroke end.

When controller 110 determines that the boom angle is maximum (YES in step S10), then, in step S12, controller 110 brings wheel loader 1 to a stop. Typically, controller 110 initiates braking even when the operator does not press the braking pedal. When controller 110 determines that the boom angle is not maximum (NO in step S10), the processing goes to step S8.

As described above, controller 110 causes wheel loader 1 to raise boom 31 on condition that distance D takes a value less than or equal to threshold value Th. Wheel loader 1 may be configured to allow the operator to forcibly cease the control by controller 110. Examples of such an operation by the operator may include an operation to press down a predetermined button (not illustrated), an operation to actuate boom control lever 122 to lower boom 31, and an operation to shift fore/aft traveling switch control lever 121 from a fore traveling position to an aft traveling position. In wheel loader 1, the operator performs the operation to shift fore/aft traveling switch control lever 121 from the fore traveling position to the aft traveling position even when wheel loader 1 is traveling forward (i.e., is not stopping).

<Advantages>

(1) As described above, sensor 40 is disposed at the predetermined position in boom 31. The predetermined position is closer to the proximal end of boom 31 than to the distal end of boom 31. Controller 110 causes wheel loader 1 to perform the predetermined action for collision avoidance, that is, the action to raise boom 31 on condition that distance D to be measured by sensor 40 when wheel loader 1 travels takes a value less than or equal to threshold value Th.

With this configuration, wheel loader 1 moves boom 31 away from vessel 901 as shown with section Q22 in FIG. 7B before collision of boom 31 with vessel 901 in the dump approach. Wheel loader 1 therefore avoids the collision of boom 31 with dump truck 900 even when the operator neglects to confirm the position of boom 31. Wheel loader 1 thus assists the operation by the operator in the dump approach.

(2) Specifically, the predetermined position corresponds to lower end 31a of boom 31. This configuration enables sensing on lower end 31a of boom 31.

(3) Sensor 40 senses lower end 31a of boom 31. This configuration enables measurement of distance D between boom 31 and vessel 901 of dump truck 900.

(4) Controller 110 brings wheel loader 1 to a stop on condition that the angle of boom 31 is maximum. This configuration prevents collision of boom 31 with vessel in a situation in which boom 31 collides with vessel 901 even when boom 31 is retreated as much as possible.

Second Embodiment

A description will be given of a wheel loader according to a second embodiment with reference to the drawings. It should be noted that a description will be given of different configurations of the wheel loader according to the second embodiment from those of wheel loader 1 according to the first embodiment; therefore, no description will be given of similar configurations of the wheel loader according to the second embodiment to those of wheel loader 1 according to the first embodiment.

Figure 10:
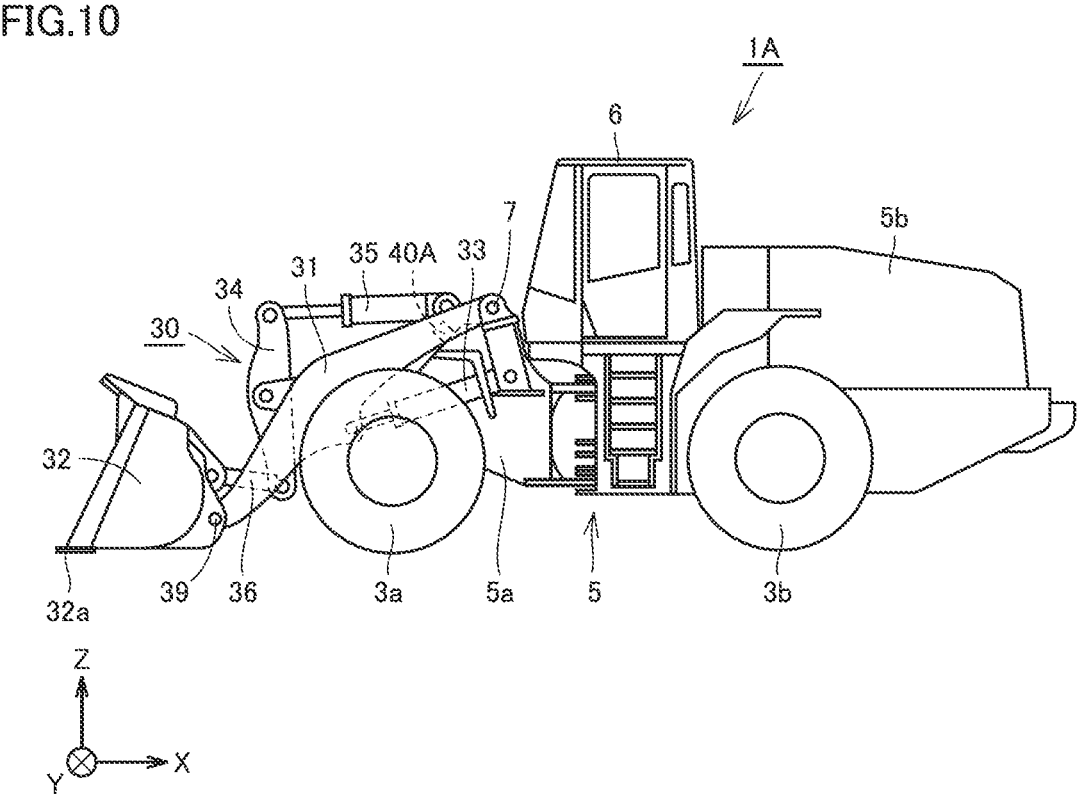
FIG. 10 is a side view of a wheel loader.
Figure 11:
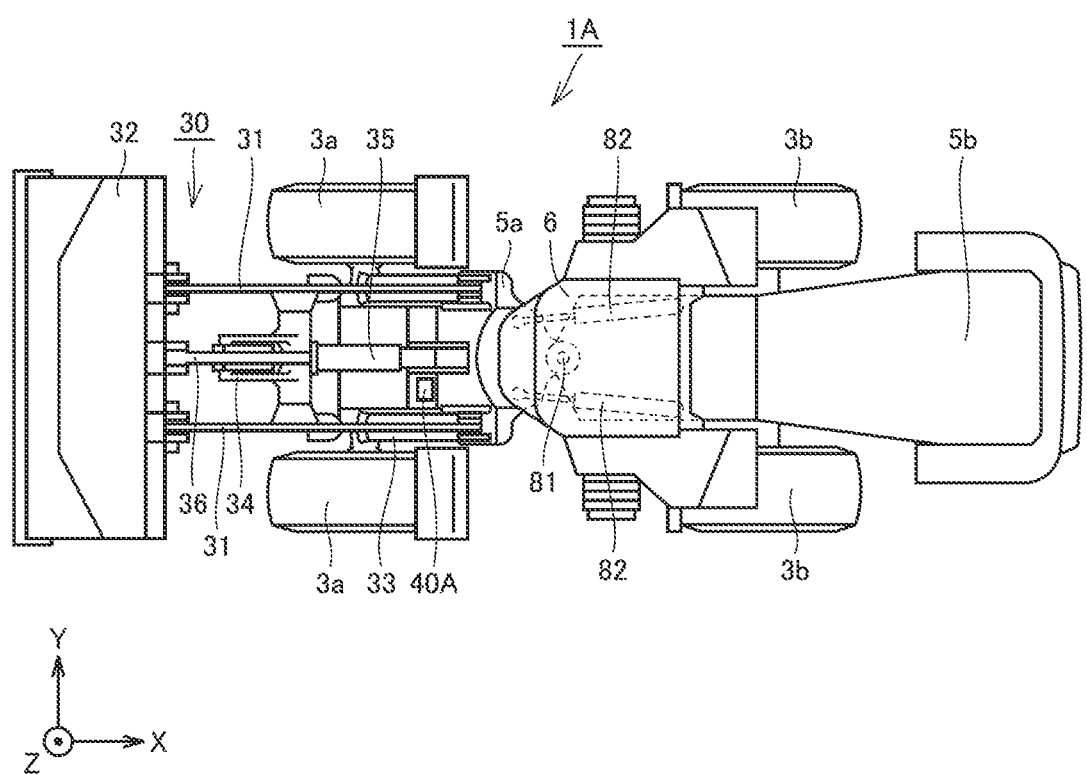
FIG. 11 is a top view of the wheel loader.
Figure 12:
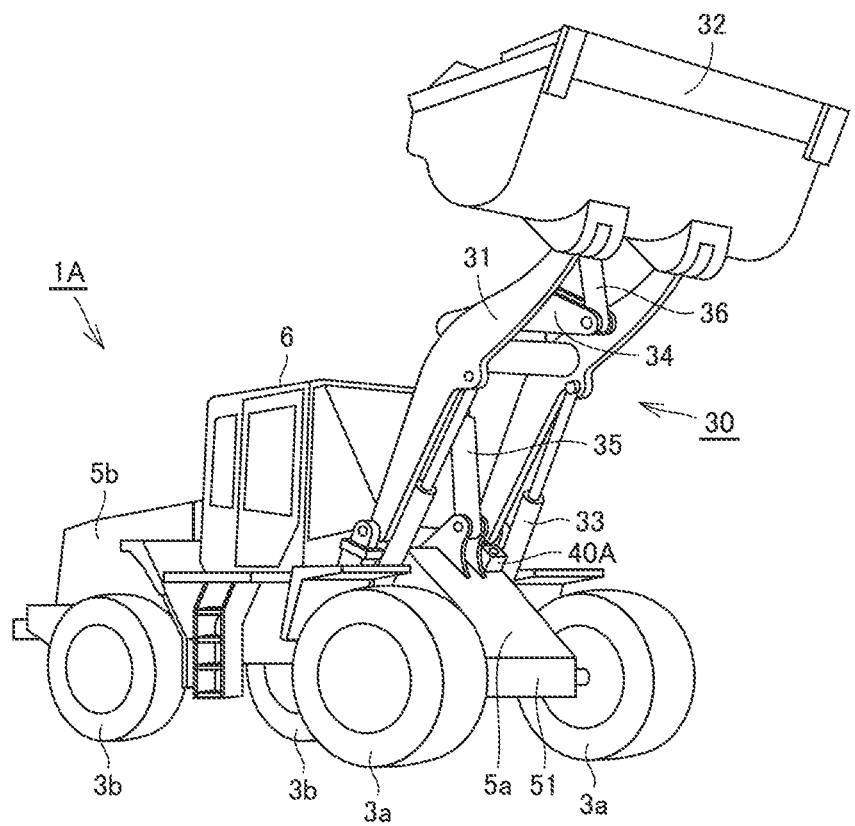
FIG. 12 is a perspective view of the wheel loader.

FIG. 10 is a side view of wheel loader 1A according to the second embodiment. FIG. 11 is a top view of wheel loader 1A. FIG. 12 is a perspective view of wheel loader 1A.

As illustrated in FIGS. 10, 11, and 12, wheel loader 1A has a hardware configuration similar to the hardware configuration of wheel loader 1A, except for a sensor 40A provided instead of sensor 40.

Sensor 40A is disposed on an upper face of a front frame 5a. Sensor 40A is disposed at a predetermined position that is closer to a position where a boom 31 is supported than to a front end 51 (see FIG. 13) of front frame 5a. Specifically, sensor 40A is disposed closer to a boom pin 7 than to the front end of front frame 5a.

Sensor 40A is disposed between a position where left boom 31 is supported and a position where a tilt cylinder 35 is supported, as seen in top view in a Y direction illustrated in FIG. 11. Sensor 40A may be disposed between a position where right boom 31 is supported and the position where tilt cylinder 35 is supported, as seen in top view.

Sensor 40A measures a distance D between boom 31 and dump truck 900 in dump approach, as in a manner similar to that of sensor 40. Specifically, sensor 40A measures distance D between boom 31 and vessel 901 of dump truck 900, as in a manner similar to that of sensor 40. Sensor 40A senses a lower end of boom 31 with boom 31 raised, as in a manner similar to that of sensor 40. Sensor 40A may be any device for measuring distance D. Examples of sensor 40A may include various devices such as an ultrasonic sensor, a laser sensor, an infrared sensor, and a camera.

Figure 13:
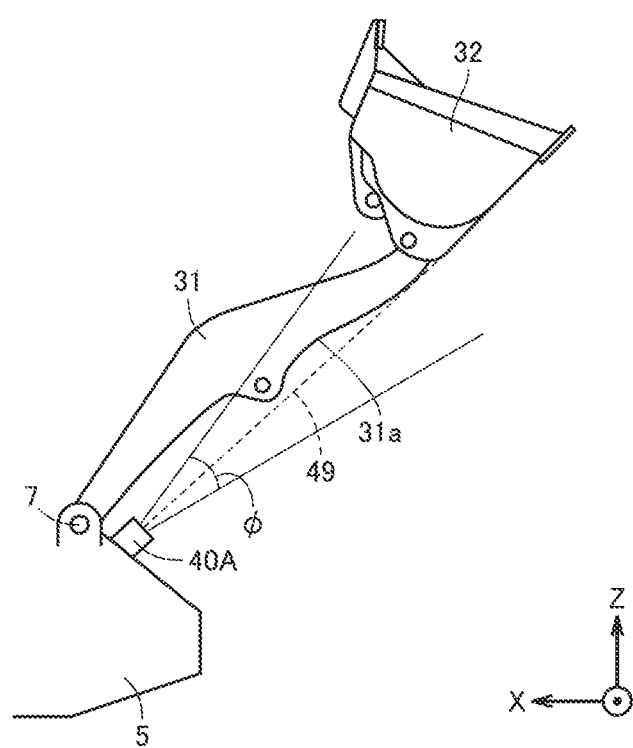
FIG. 13 schematically illustrates a sensing area of a sensor.

FIG. 13 schematically illustrates a sensing area of sensor 40A. As illustrated in FIG. 13, sensor 40A is disposed such that an optical axis 49 of sensor 40A approximately extends along boom 31 with boom 31 raised at an angle greater than or equal to a predetermined angle. The sensing area of sensor 40A is set in advance with a boom angle in the dump approach taken into consideration.

Sensor 40A senses an area covering a lower end 31a of boom 31. Sensor 40A may sense an area closer to a distal end of boom 31 than to a proximal end of boom 31, in lower end 31a of boom 31. Preferably, sensor 40A senses an area ranging from a position of a second end of each lift cylinder 33 mounted to boom 31 to the distal end of boom 31, in lower end 31a of boom 31. Alternatively, sensor 40A may sense a part of each area described above.

Sensor 40A disposed as described above measures distance D between boom 31 and the dump truck as the loading target. Information acquired by sensor 40A is sent to a controller 110 of wheel loader 1A and then is subjected to data processing in controller 110.

Controller 110 of wheel loader 1A operates like controller 110 of wheel loader 1. Specifically, controller 110 causes wheel loader 1 to perform a predetermined action for collision avoidance, that is, an action to raise boom 31 on condition that distance D to be measured by sensor 40A when wheel loader 1A travels takes a value less than or equal to a threshold value Th.

With this configuration, wheel loader 1A moves boom 31 away from vessel 901 before collision of boom 31 with vessel 901 in the dump approach. Wheel loader 1A therefore avoids the collision of boom 31 with dump truck 900 even when the operator neglects to confirm the position of boom 31 because he or she operates wheel loader 1A while directing his or her line of sight to front wheels 3a.

<<Modifications>>

A description will be given of a modification of wheel loader 1 according to the first embodiment and a modification of wheel loader 1A according to the second embodiment with reference to the drawings.

(1) Predetermined Action for Collision Avoidance

In the first and second embodiments, controller 110 causes wheel loader 1 to perform the predetermined action, that is, the action to raise boom 31 on condition that distance D to be measured by sensor 40A when wheel loader 1A travels takes a value less than or equal to threshold value Th. However, the predetermined action is not limited to the action to raise boom 31.

Controller 110 may cause speaker 152 to output a predetermined audible notification (audible alarm), in place of the control for raising boom 31. Alternatively, controller 110 may cause monitor 151 to display a predetermined warning. These configurations each make the operator aware of an abnormal state. Specifically, the operator is able to recognize that wheel loader 1, 1A almost collides with the dump truck.

Controller 110 may send a command to each of vibrators 124 to 126 such that vibrators 124 to 126 start to vibrate. The vibrations of vibrators 124, 125, and 126 vibrate corresponding control levers 121, 122, and 123. This configuration also makes the operator aware of an abnormal state.

Wheel loader 1, 1A may be configured to perform the action to raise boom 31, the output of the predetermined audible alarm from speaker 152, the display of the predetermined warning on monitor 151, and the vibrations of vibrators 124 to 126 in appropriate combination.

(2) Control with Tilt Angle Taken into Consideration

Figure 14:
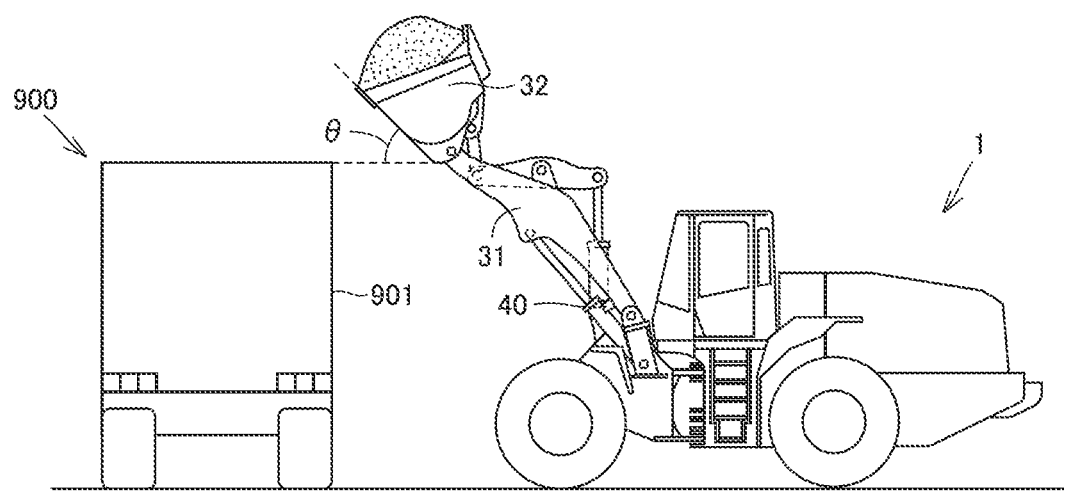
FIG. 14 illustrates a tilt angle of a bucket.

FIG. 14 illustrates a tilt angle θ of bucket 32. It should be noted that FIG. 14 illustrates wheel loader 1. As illustrated in FIG. 14, since an excavated object such as soil is loaded on bucket 32 in the dump approach, the operator needs to set tilt angle θ to be larger than a predetermined angle (hereinafter, also referred to as "angle θ1").

Therefore, wheel loader 1, 1A is not configured to always perform the predetermined action on condition that distance D takes a value less than or equal to threshold value Th, but may be configured to perform the predetermined action on condition that the tilt angle of bucket 32 is greater than or equal to predetermined angle θ1.

With this configuration, in a situation in which wheel loader 1, 1A approaches dump truck 900 with an excavated object loaded on bucket 32, wheel loader 1, 1A performs the predetermined action on condition that distance D takes a value less than or equal to threshold value Th. On the other hand, in a situation in which wheel loader 1, 1A approaches dump truck 900 with no excavated object loaded on bucket 32, wheel loader 1, 1A does not perform the predetermined action on condition that the value of distance D is less than or equal to threshold value Th.

As described above, wheel loader 1, 1A approaching dump truck 900 does not perform the predetermined action on condition that no excavated object is loaded on bucket 32.

Figure 15:
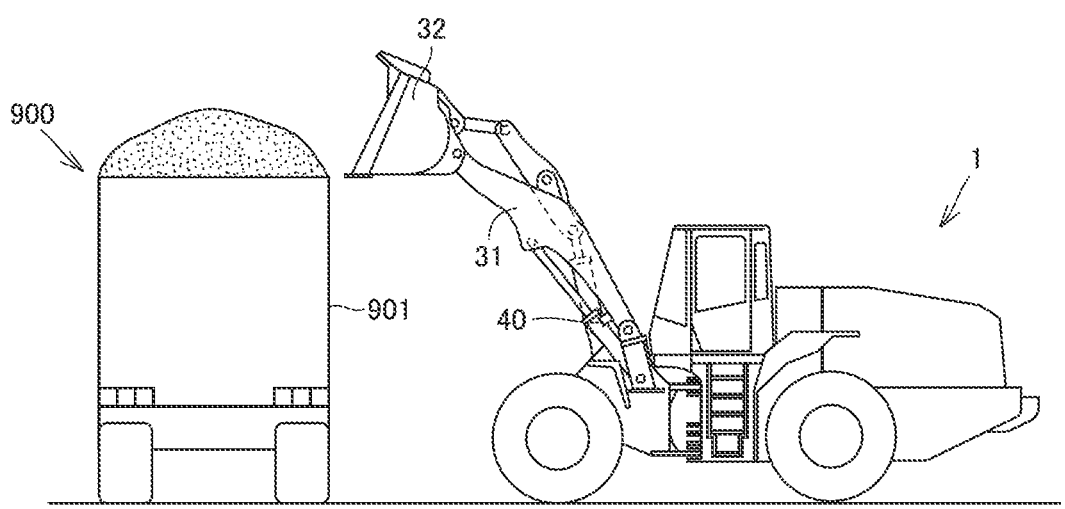
FIG. 15 illustrates how to level off an excavated object.

FIG. 15 illustrates how to level off an excavated object. It should be noted that FIG. 15 illustrates wheel loader 1. As illustrated in FIG. 15, when the operator operates wheel loader 1 to load an excavated object onto vessel 901 of dump truck 900, the excavated object can be heaped on vessel 901 beyond the height of vessel 901. In such a case, the operator sets the tilt angle of bucket 32 to be less than or equal to a predetermined angle (hereinafter, referred to as "angle θ2") that is smaller than angle θ1. The operator then operates bucket 32 to drop the excavated object heaped beyond the upper side of vessel 901. Typically, tilt angle θ of bucket 32 is set at zero (i.e., a state in which a cutting edge 32a is horizontal to main body 5), and then the soil heaped beyond the upper side of vessel 901 is dropped onto the ground opposite from wheel loader 1, 1A across dump truck 900.

The operator fails to level off the excavated object if boom 31 is automatically raised since the value of distance D is less than or equal to threshold value Th. Hence, controller 110 causes wheel loader 1 to stop the predetermined action, that is, boom-raising on condition that tilt angle θ is less than or equal to angle θ2 that is smaller than angle θ1. This configuration allows the operator to level off the excavated object.

(3) Stop of Control in Aft Traveling

In aft traveling of wheel loader 1, 1A, boom 31 never collides with vessel 901 even when the value of distance D is less than or equal to threshold value Th. Wheel loader 1, 1A therefore has no necessity to perform the predetermined action such as the action to raise boom 31. Hence, controller 110 may be configured to cause wheel loader 1, 1A to stop the predetermined action after a transition of wheel loader 1, 1A from a fore traveling state to an aft traveling state. This configuration avoids execution of unnecessary control.

<<Additional Remarks>>

A wheel loader for loading an excavated object onto a loading target includes: a front frame; a bucket; a boom having a distal end connected to the bucket, and a proximal end rotatably supported by the front frame; a sensor configured to measure a distance between the boom and the loading target; and a controller configured to control an action of the wheel loader. The controller causes the wheel loader to perform a predetermined action for collision avoidance on condition that a distance to be measured by the sensor when the wheel loader travels takes a value less than or equal to a threshold value.

With this configuration, the wheel loader traveling forward performs the predetermined action for collision avoidance before collision of the boom with the loading target. The wheel loader therefore avoids the collision of the boom with the loading target even when an operator neglects to confirm a position of the boom. The wheel loader thus assists an operation by the operator in loading the excavated object onto the loading target.

Preferably, the sensor is disposed at one of a first position in the boom, the first position being closer to the proximal end of the boom than to the distal end of the boom, and a second position in the front frame, the second position being closer to a position where the boom is supported than to a front end of the front frame. Also preferably, the first position corresponds to a lower end of the boom.

This configuration allows the sensor of the wheel loader to sense the lower end of the boom.

Preferably, the sensor is disposed at the first position and is configured to sense an area covering a lower end of the boom, the area being closer to the distal end of the boom than to the proximal end of the boom.

This configuration allows the wheel loader to measure the distance between the boom and the loading target.

Preferably, the wheel loader further includes a lift cylinder having one end mounted to a lower end of the boom, the lift cylinder being configured to drive the boom. The sensor is disposed at the first position and is configured to sense an area ranging from a position of the lift cylinder mounted to the boom to the distal end of the boom, in the lower end of the boom.

This configuration allows the wheel loader to measure the distance between the boom and the loading target.

Preferably, the predetermined action corresponds to an action to raise the boom.

This configuration allows the wheel loader traveling forward to move the boom away from the loading target before collision of the boom with the loading target. This configuration therefore allows the wheel loader to avoid the collision of the boom with the loading target even when the operator neglects to confirm the position of the boom.

Preferably, the predetermined action corresponds to an action to output a predetermined audible notification.

This configuration allows the operator to perform an operation to avoid collision of the boom with the loading target in such a manner that the operator listens to the audible notification before the collision of the boom with the loading target.

Preferably, the wheel loader further includes a control lever configured to operate the wheel loader. The predetermined action corresponds to an action to vibrate the control lever.

This configuration allows the operator to perform the operation to avoid collision of the boom with the loading target in such a manner that the operator feels the vibration of the control lever before the collision of the boom with the loading target.

Preferably, the controller brings the wheel loader to a stop on condition that the boom is raised at a maximum angle by the predetermined action.

This configuration prevents collision of the boom with the loading target in a situation in which the boom collides with the loading target even when the boom is retreated as much as possible.

Preferably, the controller causes the wheel loader to perform the predetermined action on condition that a tilt angle of the bucket takes a value greater than or equal to a first value.

This configuration prevents the wheel loader approaching the loading target from performing the predetermined action for collision avoidance on condition that no excavated object is loaded on the bucket.

Preferably, the predetermined action corresponds to an action to raise the boom. The controller causes the wheel loader to stop the action to raise the boom on condition that the tilt angle takes a value less than or equal to a second value that is smaller than the first value.

With this configuration, the operator levels off the excavated object since the wheel loader stops automatic control for boom-raising.

Preferably, the controller causes the wheel loader to stop the predetermined action on condition that the controller receives a predetermined input based on an operation by the operator.

With this configuration, the operator forcibly stops the control for raising the boom on condition that the distance between the boom and the loading target takes a value less than or equal to the threshold value.

Preferably, the predetermined action corresponds to an action to raise the boom. The operation by the operator corresponds to an operation to lower the boom.

With this configuration, the operator performs the operation to lower the boom when the boom is automatically raised. This operation enables a forcible stop of the control for automatically raising the boom.

Preferably, the wheel loader further includes a fore/aft traveling switch lever configured to switch between fore traveling of the wheel loader and aft traveling of the wheel loader. The operation by the operator corresponds to an operation to shift the fore/aft traveling switch lever from a fore traveling position to an aft traveling position.

With this configuration, the fore/aft traveling switch lever switching operation allows a forcible stop of the control for raising the boom on condition that the distance between the boom and the loading target takes a value less than or equal to the threshold value.

Preferably, the controller causes the wheel loader to stop the predetermined action after a transition of the wheel loader from a fore traveling state to an aft traveling state.

With this configuration, the controller causes the wheel loader in the aft traveling state to stop the action to raise the boom on condition that the distance between the boom and the loading target takes a value less than or equal to the threshold value.

A method for controlling a wheel loader configured to load an excavated object onto a loading target includes the steps of: measuring a distance between a boom of the wheel loader and the loading target; determining that the distance measured takes a value less than or equal to a threshold value when the wheel loader travels; and causing the wheel loader to perform a predetermined action for collision avoidance on condition that the value of the distance measured is less than or equal to the threshold value.

By this method, the wheel loader traveling forward performs the predetermined action for collision avoidance before collision of the boom with the loading target. The wheel loader therefore avoids the collision of the boom with the loading target even when the operator neglects to confirm the position of the boom. The wheel loader thus assists an operation by the operator in loading the excavated object onto the loading target.

It should be understood that the embodiments disclosed herein are in all aspects illustrative and not restrictive. The scope of the present invention is defined by the appended claims rather than the foregoing description, and all changes that fall within metes and bounds of the claims, or equivalence such metes and bounds thereof are therefore intended to be embraced by the claims.

REFERENCE SIGNS LIST 1, 1A: wheel loader, 3a: front wheel, 3b: rear wheel, 5: main body, 5a: front frame, 5b: rear frame, 6: operator's cab, 7: boom pin, 30: work implement, 31: boom, 31a: lower end, 32: bucket, 32a: cutting edge, 33: lift cylinder, 34: bell crank, 35: tilt cylinder, 36: tilt rod, 39: bucket pin, 40, 40A: sensor, 41: lens, 48, 49: optical axis, 900: dump truck, 901: vessel

The invention claimed is:
1. A wheel loader comprising:
a main body;
a work implement including a boom attached to the main body;

a sensor that measures a distance between the wheel loader and a loading target onto which an excavated object excavated by the work implement is to be loaded; and a controller that automatically raises the boom without an operator operation on condition that the distance to be measured by the sensor, as the wheel loader travels forwards, takes a value less than or equal to a threshold value.

2. The wheel loader according to claim 1, wherein the controller stops raising the boom on condition that an operation to lower the boom by an operator is accepted while the boom is being raised.

3. The wheel loader according to claim 1, wherein the loading target is a vessel of a dump truck.

4. The wheel loader according to claim 1, wherein the sensor is a laser sensor.

5. The wheel loader according to claim 1, wherein the sensor measures a distance between the boom and the loading target.

6. A wheel loader comprising:

a main body;

a work implement including a boom attached to the main body;

a sensor that measures a distance between the wheel loader and a loading target onto which an excavated object excavated by the work implement is to be loaded; and a controller that causes the wheel loader to automatically perform a predetermined action for collision avoidance without an operator operation on condition that the distance to be measured by the sensor, as the wheel loader travels forwards, takes a value less than or equal to a threshold value, wherein the controller stops the predetermined action on condition that an operation by an operator is accepted while the predetermined action is being performed.

7. The wheel loader according to claim 6, wherein the predetermined action includes one of an action to raise the boom and an action to bring the wheel loader to a stop.

8. A method for controlling a wheel loader having a work implement, the method comprising:

measuring, by a sensor of the wheel loader, a distance between the wheel loader and a loading target onto which an excavated object excavated by the work implement is to be loaded; and automatically raising, by a controller of the wheel loader, a boom of the work implement without an operator operation on condition that the distance to be measured by the sensor, as the wheel loader travels forwards, takes a value less than or equal to a threshold value.

9. A method for controlling a wheel loader having a work implement, the method comprising:

measuring, by a sensor of the wheel loader, a distance between the wheel loader and a loading target onto which an excavated object excavated by the work implement is to be loaded;

causing, by a controller of the wheel loader, the wheel loader to automatically perform a predetermined action for collision avoidance without an operator operation on condition that the distance to be measured by the sensor, as the wheel loader travels forwards, takes a value less than or equal to a threshold value; and stopping, by the controller, the predetermined action on condition that an operation by an operator is accepted while the predetermined action is being performed.

* * * * *